(12) United States Patent
Kossett et al.

(10) Patent No.: US 10,526,029 B2
(45) Date of Patent: Jan. 7, 2020

(54) TWO WHEELED ROBOT WITH CONVERTIBILITY AND ACCESSORIES

(71) Applicant: ReconRobotics, Inc., Edina, MN (US)

(72) Inventors: Alex J. Kossett, Minnetonka, MN (US); Andrew Drenner, Bloomington, MN (US)

(73) Assignee: ReconRobotics, Inc., Edina, MN (US)

( * ) Notice: Subject to any disclaimer, the term of this patent is extended or adjusted under 35 U.S.C. 154(b) by 0 days.

(21) Appl. No.: 15/998,837

(22) Filed: Aug. 15, 2018

(65) Prior Publication Data

US 2019/0092406 A1    Mar. 28, 2019

Related U.S. Application Data

(60) Provisional application No. 62/545,902, filed on Aug. 15, 2017.

(51) Int. Cl.
*B62D 57/02* (2006.01)
*B60R 16/023* (2006.01)
(Continued)

(52) U.S. Cl.
CPC .......... *B62D 57/02* (2013.01); *B60R 16/0231* (2013.01); *F41H 7/005* (2013.01);
(Continued)

(58) Field of Classification Search
CPC ........ B62D 57/02; B62D 57/04; B62D 61/00; F41H 7/005; B60R 16/0231; B60K 1/04;
(Continued)

(56) References Cited

U.S. PATENT DOCUMENTS 1,408,885 A    3/1922    Humphrey
2,818,301 A    12/1957   Hayden
(Continued)

FOREIGN PATENT DOCUMENTS

CN    202138435 U    2/2012
CN    104228998      12/2014
(Continued)

OTHER PUBLICATIONS

International Search Report for Application No. PCT/US2018/000198 dated Dec. 17, 2018 (12 pgs.).
(Continued)

*Primary Examiner* — Jacob B Meyer
(74) *Attorney, Agent, or Firm* — Christensen, Fonder, Dardi & Herbert PLLC

(57) ABSTRACT

A two wheeled robot with a pair of motorized wheels mounted on each end of a body and a rearwardly extending tail. The body comprising a chassis with sides and exterior side surfaces and providing an accessory mounting interface. The interface having a matrixical arrangement of threaded holes and one or more landings, the landings having an outwardly facing planar landing surface with hole openings at the landing surface. An accessory with a robot mounting interface cooperates with the chassis at the accessory mounting interface such that prior to fastening the accessory has a single degree of freedom of movement. Screws extend through portions of the accessory into select ones of the threaded holes of the matrixical arrangement.

20 Claims, 8 Drawing Sheets

(51) Int. Cl.

| | | |
|---|---|---|
| *F41H 7/00* | (2006.01) | |
| *B25J 9/16* | (2006.01) | |
| *B25J 5/00* | (2006.01) | |
| *B60K 1/02* | (2006.01) | |
| *B60K 1/04* | (2019.01) | |
| *B62D 61/00* | (2006.01) | |
| *B62D 57/04* | (2006.01) | |

(52) U.S. Cl.
CPC ............... *B25J 5/007* (2013.01); *B25J 9/163* (2013.01); *B25J 9/1633* (2013.01); *B60K 1/02* (2013.01); *B60K 1/04* (2013.01); *B62D 57/04* (2013.01); *B62D 61/00* (2013.01)

(58) Field of Classification Search
CPC . B60K 1/02; B25J 9/163; B25J 9/1633; B25J 5/007
See application file for complete search history.

(56) References Cited

U.S. PATENT DOCUMENTS

| | | | |
|---|---|---|---|
| 4,061,199 A | 12/1977 | Last | |
| 4,300,308 A | 11/1981 | Ikeda | |
| 4,334,221 A | 6/1982 | Rosenhagen et al. | |
| 4,402,158 A | 9/1983 | Seki et al. | |
| 4,406,085 A | 9/1983 | Rhodes | |
| 4,443,968 A | 4/1984 | Law | |
| 4,572,530 A | 2/1986 | Marino | |
| 4,575,304 A | 3/1986 | Nakagawa et al. | |
| 4,648,853 A | 3/1987 | Siegfried | |
| 4,736,826 A | 4/1988 | White et al. | |
| 4,773,889 A | 9/1988 | Rosenwinkel et al. | |
| 4,899,945 A | 2/1990 | Jones | |
| 4,906,051 A | 3/1990 | Vilhauer, Jr. | |
| 4,913,458 A | 4/1990 | Hamilton | |
| 4,993,912 A | 2/1991 | King et al. | |
| 5,085,062 A | 2/1992 | Capdevila | |
| 5,129,709 A | 7/1992 | Klamer | |
| D338,474 S | 8/1993 | Christensen | |
| 5,241,380 A | 8/1993 | Benson et al. | |
| 5,350,033 A | 9/1994 | Kraft | |
| 5,473,364 A | 12/1995 | Burt | |
| 5,487,692 A | 1/1996 | Mowrer et al. | |
| 5,551,545 A | 9/1996 | Gelfman | |
| 5,554,914 A | 9/1996 | Miyazawa | |
| 5,576,605 A | 11/1996 | Miyazawa | |
| 5,596,255 A | 1/1997 | Miyazawa | |
| 5,610,488 A | 3/1997 | Miyazawa | |
| 5,721,691 A | 2/1998 | Wuller et al. | |
| 5,732,074 A | 3/1998 | Spaur et al. | |
| 5,759,083 A | 6/1998 | Polumbaum et al. | |
| 5,762,533 A | 6/1998 | Tilbor et al. | |
| 5,781,005 A | 7/1998 | Vig et al. | |
| 5,839,795 A | 11/1998 | Matsuda et al. | |
| 5,871,386 A | 2/1999 | Bart et al. | |
| 5,888,135 A | 3/1999 | Barton, Jr. et al. | |
| 5,908,454 A | 6/1999 | Zyburt et al. | |
| 6,046,565 A | 4/2000 | Thorne | |
| 6,066,026 A | 5/2000 | Bart et al. | |
| 6,101,951 A | 8/2000 | Sigel | |
| 6,109,568 A | 8/2000 | Gilbert et al. | |
| 6,199,880 B1 | 3/2001 | Favorito et al. | |
| 6,313,724 B1 | 11/2001 | Osterweil | |
| 6,322,088 B1 | 11/2001 | Klamer et al. | |
| 6,502,657 B2 | 1/2003 | Kerrebrock et al. | |
| 6,548,982 B1 | 4/2003 | Papanikolopoulos et al. | |
| 6,574,536 B1 | 6/2003 | Kawagoe et al. | |
| 6,824,508 B2 | 11/2004 | Kim et al. | |
| 6,860,346 B2 * | 3/2005 | Burt .................. | B60B 15/00 180/218 |
| 6,902,464 B1 | 6/2005 | Lee | |
| D540,503 S | 4/2007 | Tsang | |
| 7,249,640 B2 | 7/2007 | Horchler et al. | |
| D584,366 S | 1/2009 | Bowen et al. | |
| 7,559,385 B1 * | 7/2009 | Burt .................. | B60K 7/0007 180/167 |
| D626,577 S * | 11/2010 | Carlson ............ | D15/199 |
| D637,217 S * | 5/2011 | Carlson ............ | D15/199 |
| 8,186,469 B2 | 5/2012 | Yim et al. | |
| 8,197,298 B2 * | 6/2012 | Willett ............. | A63H 17/02 446/164 |
| 8,342,440 B2 * | 1/2013 | Papanikolopoulos ...... | A63H 27/12 244/17.11 |
| 8,496,077 B2 | 7/2013 | Nesnas et al. | |
| 8,505,667 B2 | 8/2013 | Kim et al. | |
| 8,636,096 B2 | 1/2014 | Kim et al. | |
| 8,720,614 B2 * | 5/2014 | Nesnas ............. | B25J 5/007 180/7.5 |
| 8,776,977 B2 | 7/2014 | Lansberry et al. | |
| 9,020,639 B2 | 4/2015 | Bewley et al. | |
| 9,061,544 B2 * | 6/2015 | Carlson ............ | B62D 57/02 |
| 9,557,740 B2 | 1/2017 | Crawley | |
| 9,733,720 B2 | 8/2017 | Kavli et al. | |
| 10,046,819 B1 | 8/2018 | Sellner | |
| 10,124,483 B1 * | 11/2018 | Cotton ............. | B62D 61/00 |
| 2003/0038607 A1 | 2/2003 | Yim et al. | |
| 2003/0092964 A1 | 5/2003 | Kim et al. | |
| 2003/0137268 A1 * | 7/2003 | Papanikolopoulos . | B62D 57/02 318/568.11 |
| 2004/0000439 A1 * | 1/2004 | Burt .................. | B60B 15/00 180/7.1 |
| 2008/0143065 A1 | 6/2008 | DeFazio et al. | |
| 2009/0099709 A1 | 4/2009 | Troy | |
| 2010/0032224 A1 | 2/2010 | Liu | |
| 2010/0152922 A1 * | 6/2010 | Carlson ............ | B62D 57/02 701/2 |
| 2010/0318059 A1 | 12/2010 | Farritor et al. | |
| 2011/0139923 A1 * | 6/2011 | Papanikolopoulos ...... | A63H 27/12 244/2 |
| 2012/0059520 A1 * | 3/2012 | Kossett ............ | B60B 1/042 700/264 |
| 2012/0073930 A1 | 3/2012 | Lansberry et al. | |
| 2012/0137862 A1 * | 6/2012 | Kossett ............ | B25J 11/0025 89/1.13 |
| 2014/0208976 A1 | 7/2014 | Jung et al. | |
| 2014/0224560 A1 * | 8/2014 | Carlson ............ | B62D 57/02 180/218 |
| 2015/0175202 A1 | 6/2015 | MacGregor et al. | |
| 2016/0144517 A1 * | 5/2016 | Carlson ............ | B62D 57/02 180/218 |
| 2018/0290312 A1 * | 10/2018 | Carlson ............ | B62D 57/02 |
| 2019/0002045 A1 * | 1/2019 | Sellner ............. | B62D 61/00 |
| 2019/0054633 A1 * | 2/2019 | Kossett ............ | B25J 13/085 |
| 2019/0054641 A1 * | 2/2019 | Kossett ............ | B25J 19/027 |
| 2019/0092406 A1 * | 3/2019 | Kossett ............ | F41H 7/005 |

FOREIGN PATENT DOCUMENTS

| | | |
|---|---|---|
| EP | 1870254 | 12/2007 |
| FR | 2567078 | 1/1986 |
| JP | 63-269701 | 10/1996 |
| JP | 10-69314 | 3/1998 |
| KR | 10-1184023 | 9/2012 |
| KR | 10-1217846 | 1/2013 |
| KR | 10-1226261 | 1/2013 |
| KR | 10-20110139912 | 1/2013 |
| KR | 10-2014-0097709 | 8/2014 |
| RU | 89837 U1 | 12/2009 |
| WO | WO2002/24417 | 3/2002 |
| WO | WO2013/059515 | 4/2013 |
| WO | WO2013/103171 | 7/2013 |

OTHER PUBLICATIONS

International Search Report for Application No. PCT/US2018/000182 dated Jan. 3, 2019 (16 pgs.).

(56) References Cited

OTHER PUBLICATIONS

International Search Report for Application No. PCT/US2018/000161 dated Dec. 14, 2018 (19 pgs.).

* cited by examiner

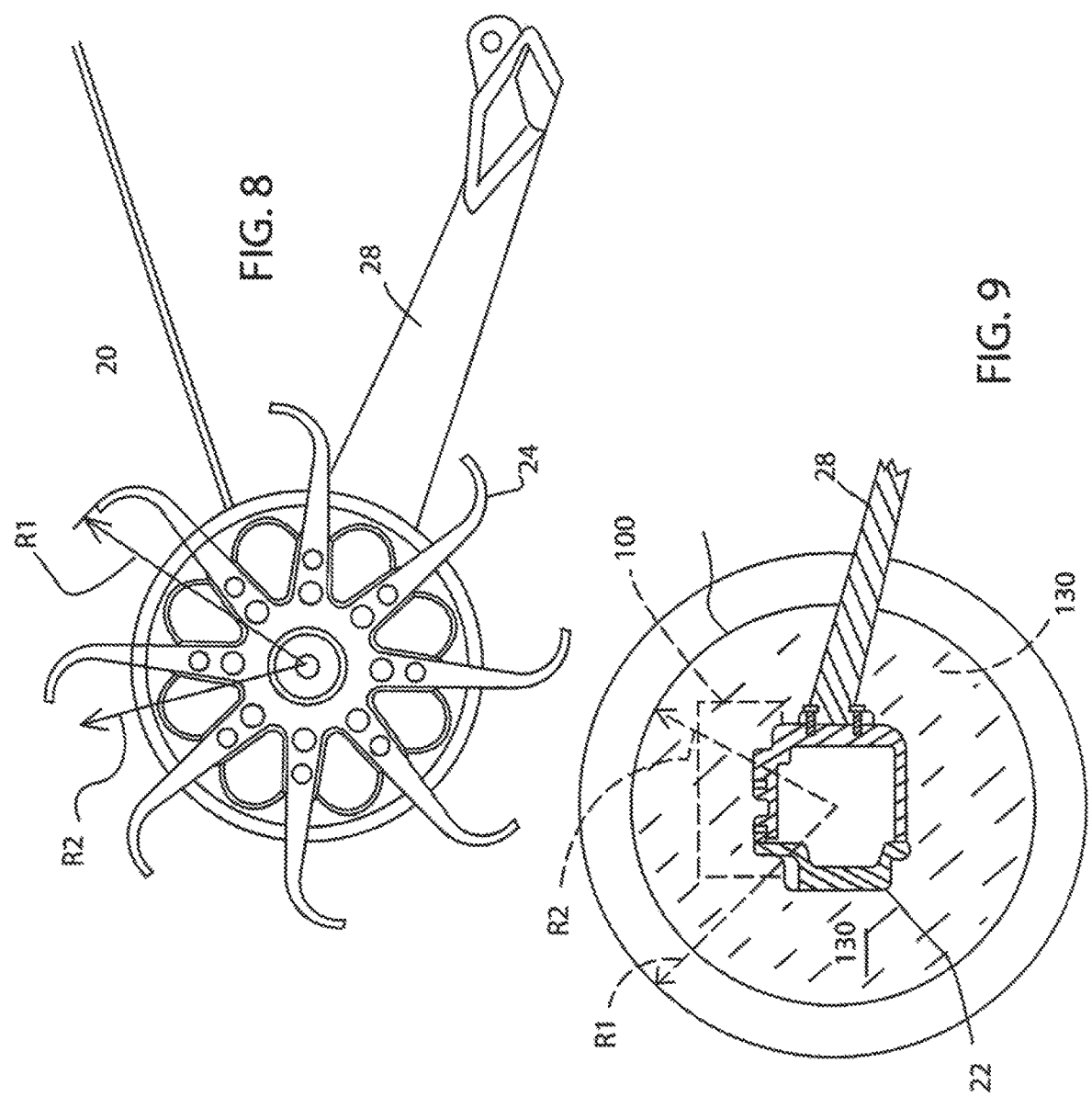

TWO WHEELED ROBOT WITH CONVERTIBILITY AND ACCESSORIES

CROSS-REFERENCE TO RELATED APPLICATION

The application claims priority to U.S. Provisional Application 62/545,902 filed Aug. 15, 2017, the contents of which is incorporated herein by reference.

BACKGROUND OF THE INVENTION

Remote controlled throwable robots are utilized in military and policing operations. Providing modularity and flexibility in attaching useful accessories that may be securely attached thereto would be welcome by users.

SUMMARY OF THE INVENTION

In embodiments, a two wheeled robot with a pair of motorized wheels mounted on each end of a body and a rearwardly extending tail is provided. The body comprising a chassis with at least two chassis portions, the two chassis portions assembled together defining an open interior. Mounted in the chassis in the open interior is at least one motor, a circuit board with processing circuitry, and a battery. The body may include a forwardly directed camera.

Each of the pair of wheels have a collapsed diameter defining a cylindrical envelope parallel to the body. The space between the body and the cylindrical envelope defining an annular mounting space for accessories.

In embodiments, the body has four sides, a top side, a bottom side, a rearward side, and a forward side. The body comprising a chassis with sides and exterior side surfaces and providing an accessory mounting interface. The chassis having a side with a planar landing having a matrixical arrangement of threaded holes. The landing having an outwardly facing landing surface with hole openings at the landing surface. The landing having landing sides with sidewall surfaces extending in an inward direction for the landing. In embodiments, the landing with a planar landing surface has recesses therein spaced from the threaded holes. In embodiments the accessory mounting interface comprising at least two adjacent sides, each side having planar side surfaces with the planar surface on one of the two adjacent sides being perpendicular to the planar surface on the other of the two adjacent sides.

In embodiments, each of the at least two adjacent side surfaces have projections with outwardly facing landings, and the landings have a matrixical arrangement of threaded holes, the threaded holes extending toward the open interior but not into the open interior. In embodiments, the landing having a planar outwardly facing surface. The threaded holes being perpendicular to an outer surface of the landing. The projections having projection sidewall surfaces leading to the respective landing surface. The projections of each side being unitary with one of the chassis portions.

In embodiments, the accessory is attached within the cylindrical envelope. The accessory having mating projections that extend below the landing surfaces and are positioned to abut against projection sidewalls or positioned in recesses.

The accessory when positioned on the exterior surface of the robot, having a single degree of freedom. In embodiments the single degree of freedom being in the same direction as the axis of at least on threaded hole.

The accessory may be attached with a plurality of threaded fasteners extending inwardly and being within the cylindrical envelope. The accessory having surfaces for abutting with the projection sidewall surfaces and/or for fitting into recesses on the respective sides of the robot.

In embodiments the projections have a landing with projection side walls, the projection defining a dovetail attachment portion, in embodiments the dovetail defining a rail. In embodiments the rail may be configured as a Picatinny rail. The accessory having a clamp for attachment to the rail. The projections being unitary with chassis portions, the chassis portions defining a chassis interior that secures therein at least one motor, at least one battery, radio and control circuitry.

In embodiments, the at least one landing has inwardly extending recesses for capturing portions of the accessory. The recesses extending inwardly in the same direction as the threaded holes.

A throwable robot having only two motorized wheels supported by a body, the body comprising a housing with a matrixical arrangement of threaded holes extending into an exterior surface of the housing, the matrixical arrangement extending at least most of the distance between the two wheels. The matrixical arrangement having at least one row of threaded holes in alignment, the row comprising at least four holes. In embodiments the row comprises at least three holes in alignment. In embodiments, the matrixical arrangement comprises at least two rows of threaded holes, with adjacent pairs of holes having equal spacing between the holes. In embodiments, at least two adjacent sides each have a matrixical arrangement of holes. The threaded holes not extending through the walls of the housing thereby maintaining a watertight integrity of the enclosure. In embodiments the entries of the threaded holes comprising the matrixical arrangement are coplanar.

A feature and advantage of embodiments is that a robot with an accessory mounted thereto by threaded fasteners, such as screws, may be thrown and the accessory/robot interface distributes shear forces from impact of the robot with a floor or ground to abutting surfaces between the accessory and the robot rather than to the screws or threaded fasteners securing the accessory to the robot.

A feature and advantage of embodiments is that the matrixical arrangement of holes may be utilized for adjustable mounting accessories and portions of the robot. For example different tails may be utilized. And a specific tail may be mounted in different orientations to angularly position a forward facing fixed camera or accessory on the robot as desired. For example, the tail may be rotated 180 degrees to provide a different angle of viewing for a camera directed forwardly from the housing.

The accessory interfaces may be utilized for mounting accessories such as sensor devices, munitions, communication hardware, illumination devices, gas dispensing devices, or devices with other functionalities. The accessory may be operated remotely by way of a remote controller that operates the robot. Communications circuitry and operational circuitry may be separate from or included in the remote controller that operates the robot. In embodiments, the accessories have a cooperating robot interface allowing the accessory to be attached directly, or by way of an intermediate bracket, to the accessory interface of the robot. The accessory having surfaces that abut with the planar landing surface and surfaces that engage the chassis in the landing recesses or on the landing sidewall surfaces. Such an arrangement minimizes transfer of impact forces to fasteners attaching the accessory to the robot.

DESCRIPTION OF THE DRAWINGS

FIG. 8 is an end elevational view of a robot showing the undeflected diameter of wheels and the deflected diameter under impact conditions.

FIG. 9 illustrates the accessory mounting region defined by the body and the envelope defined by the deflected diameter of the wheel.

DETAILED DESCRIPTION

Figure 1:
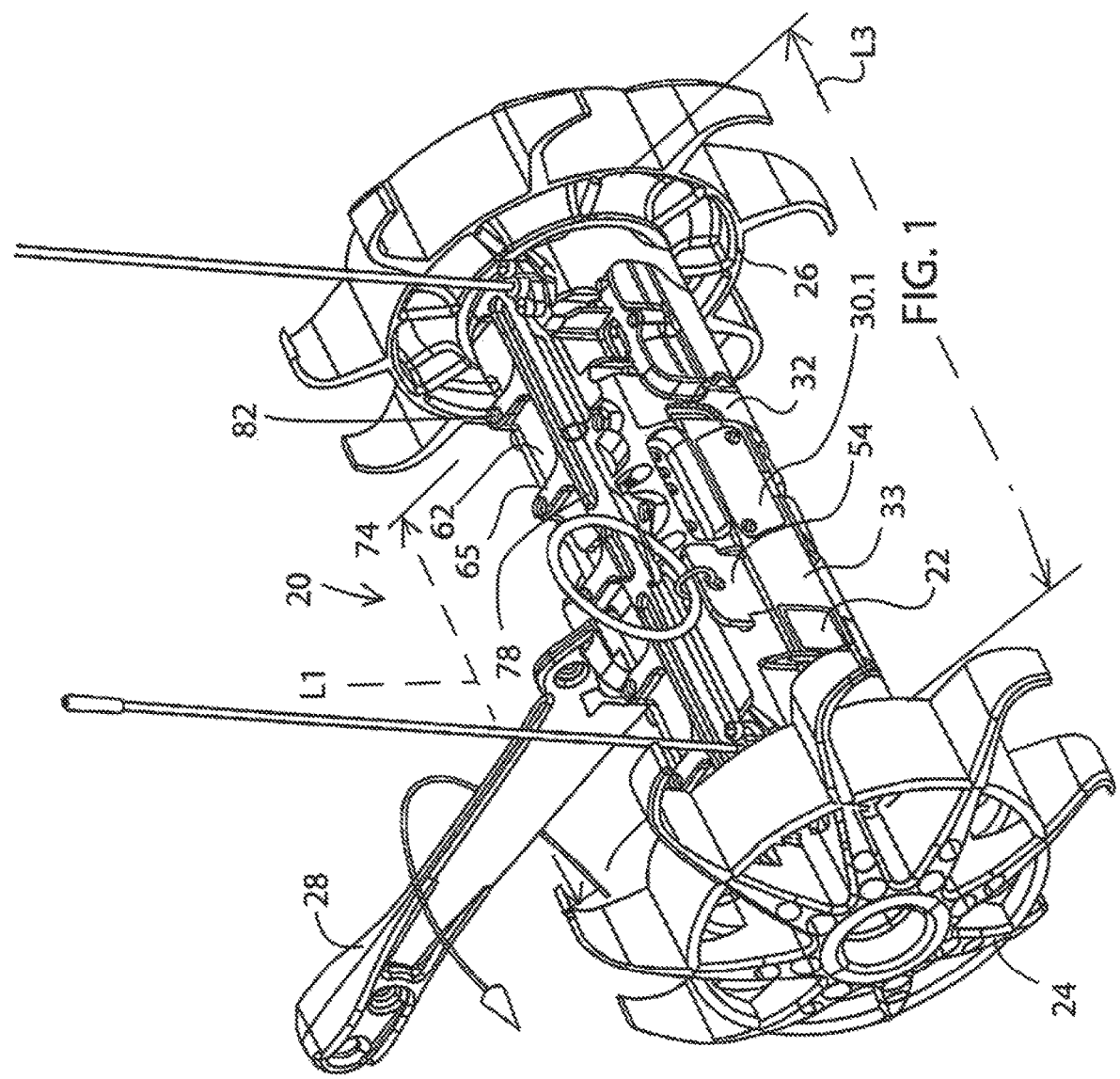
FIG. 1 is a front perspective view of a throwable robot according to embodiments.
Figure 2:
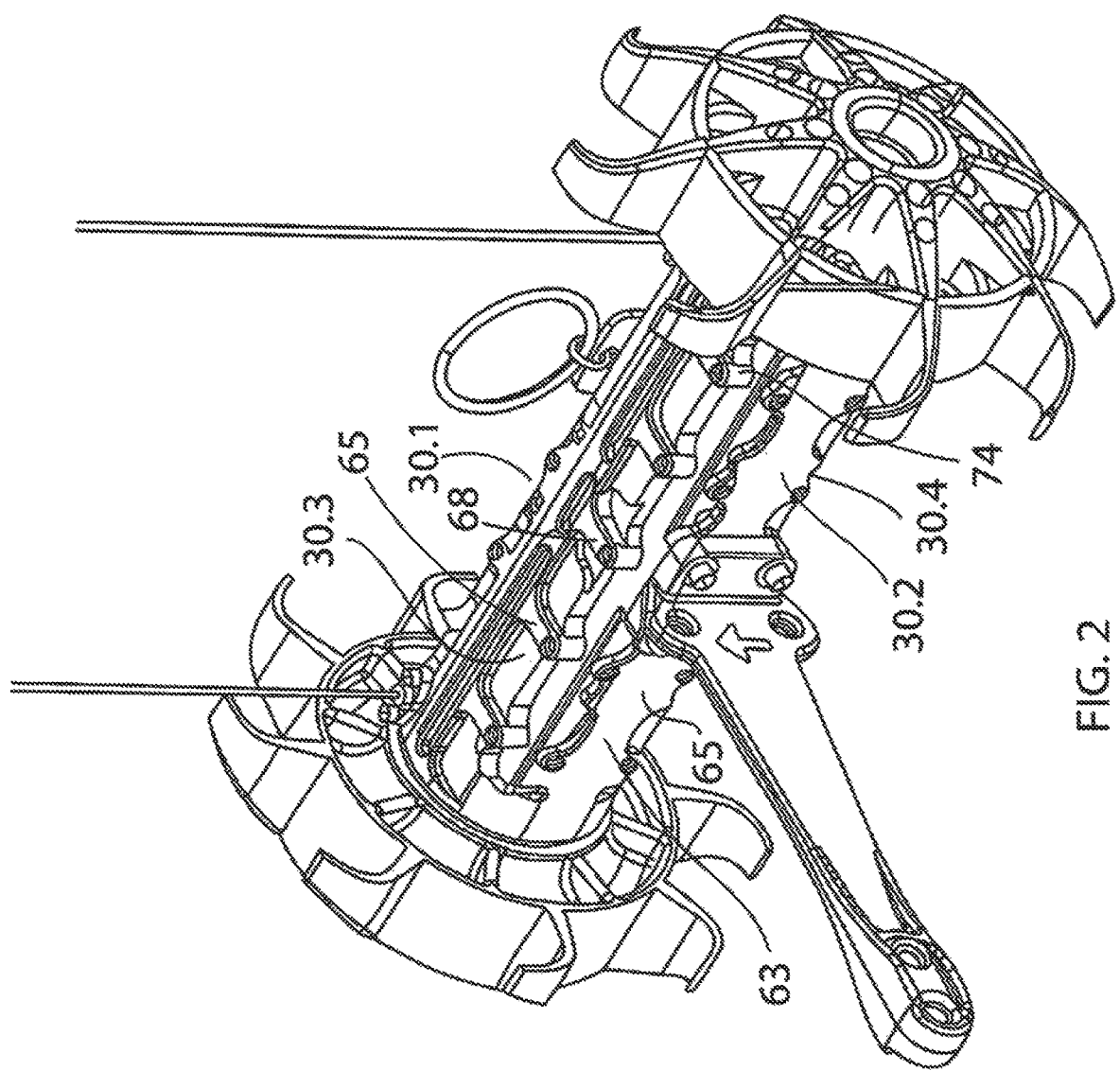
FIG. 2 is a rear perspective view of the throwable robot of FIG. 1.
Figure 3:
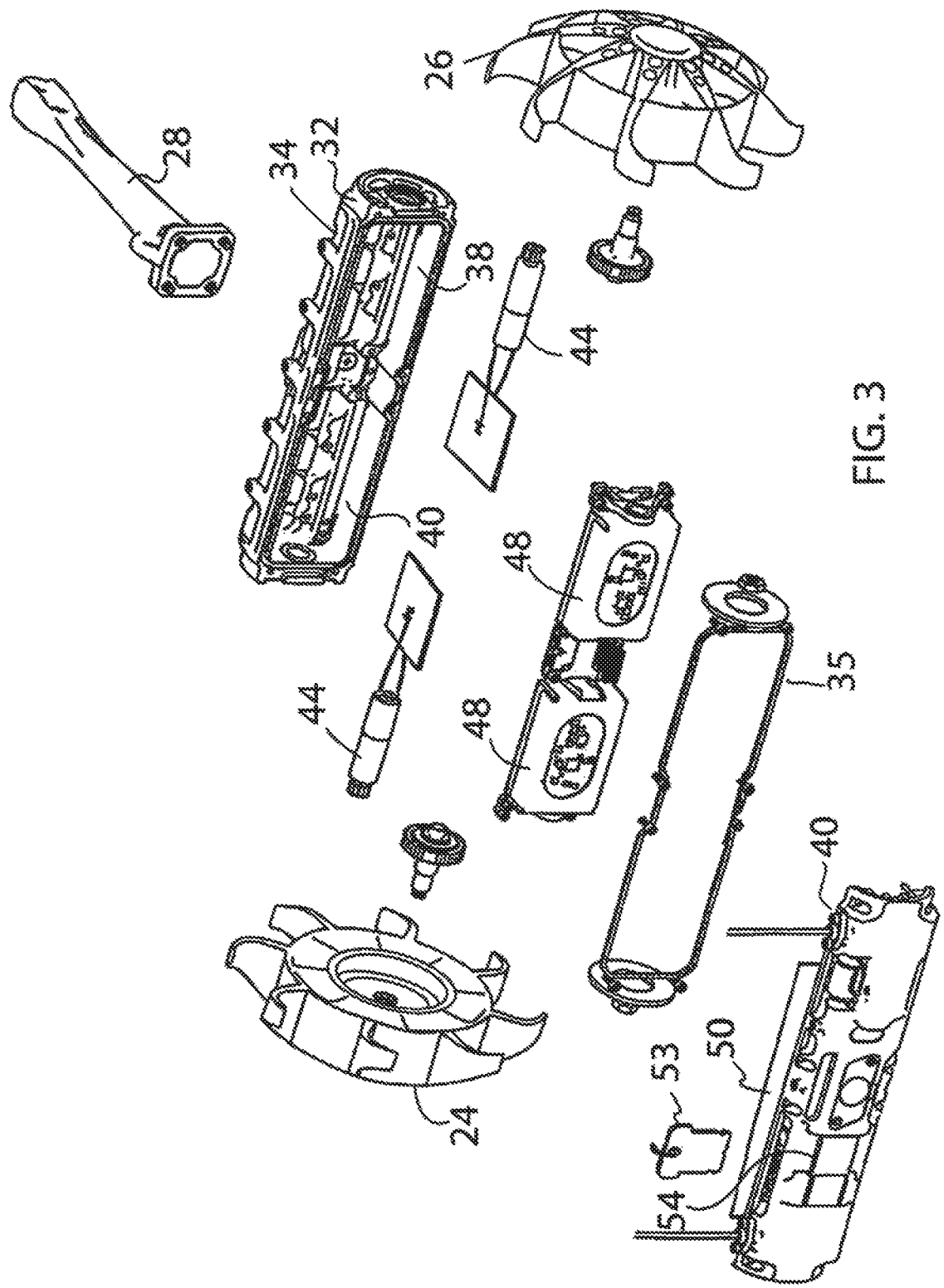
FIG. 3 is an exploded view of a throwable robot according to embodiments.
Figure 4:
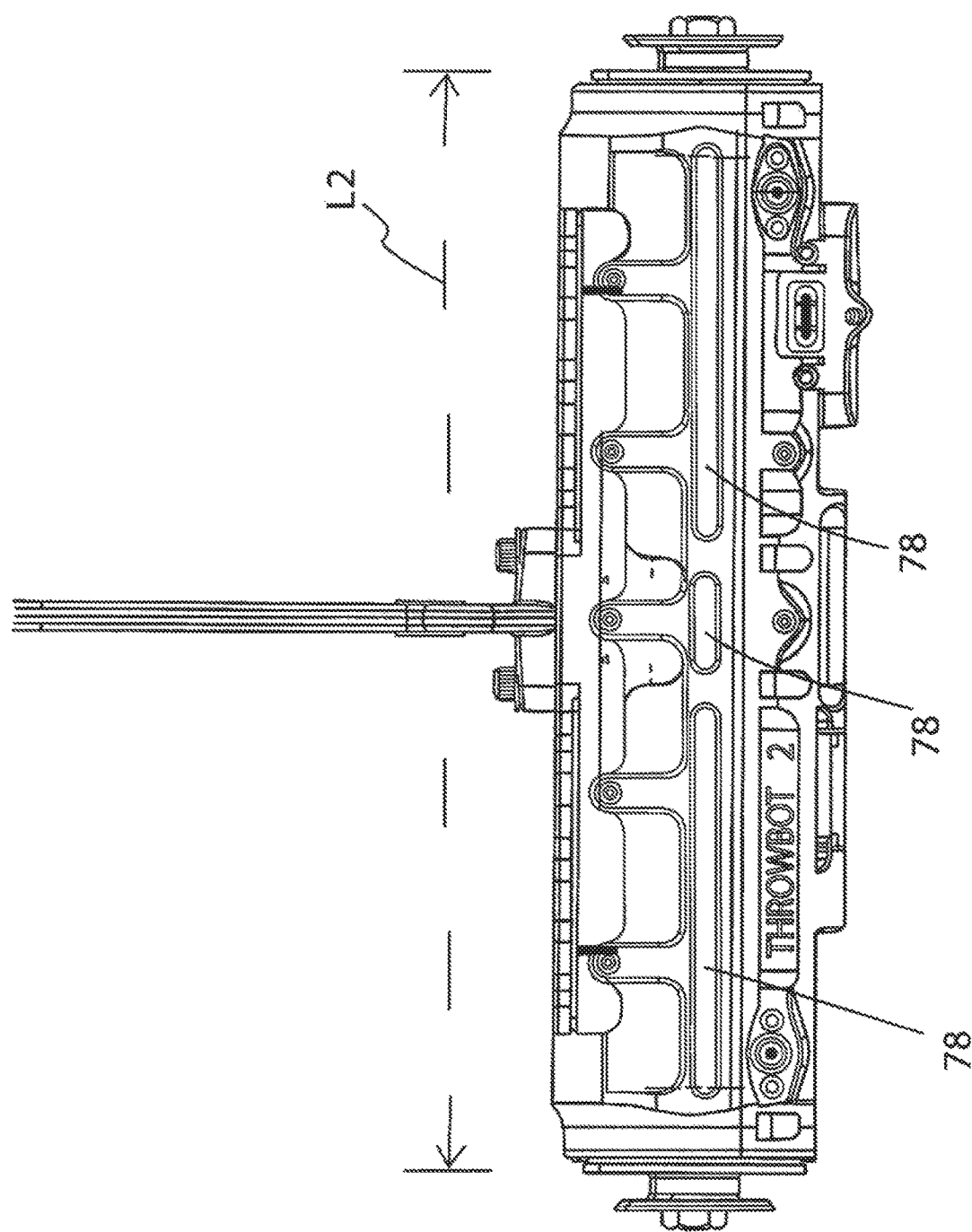
FIG. 4 is top plan view of the body of a robot according to embodiments.
Figure 5:
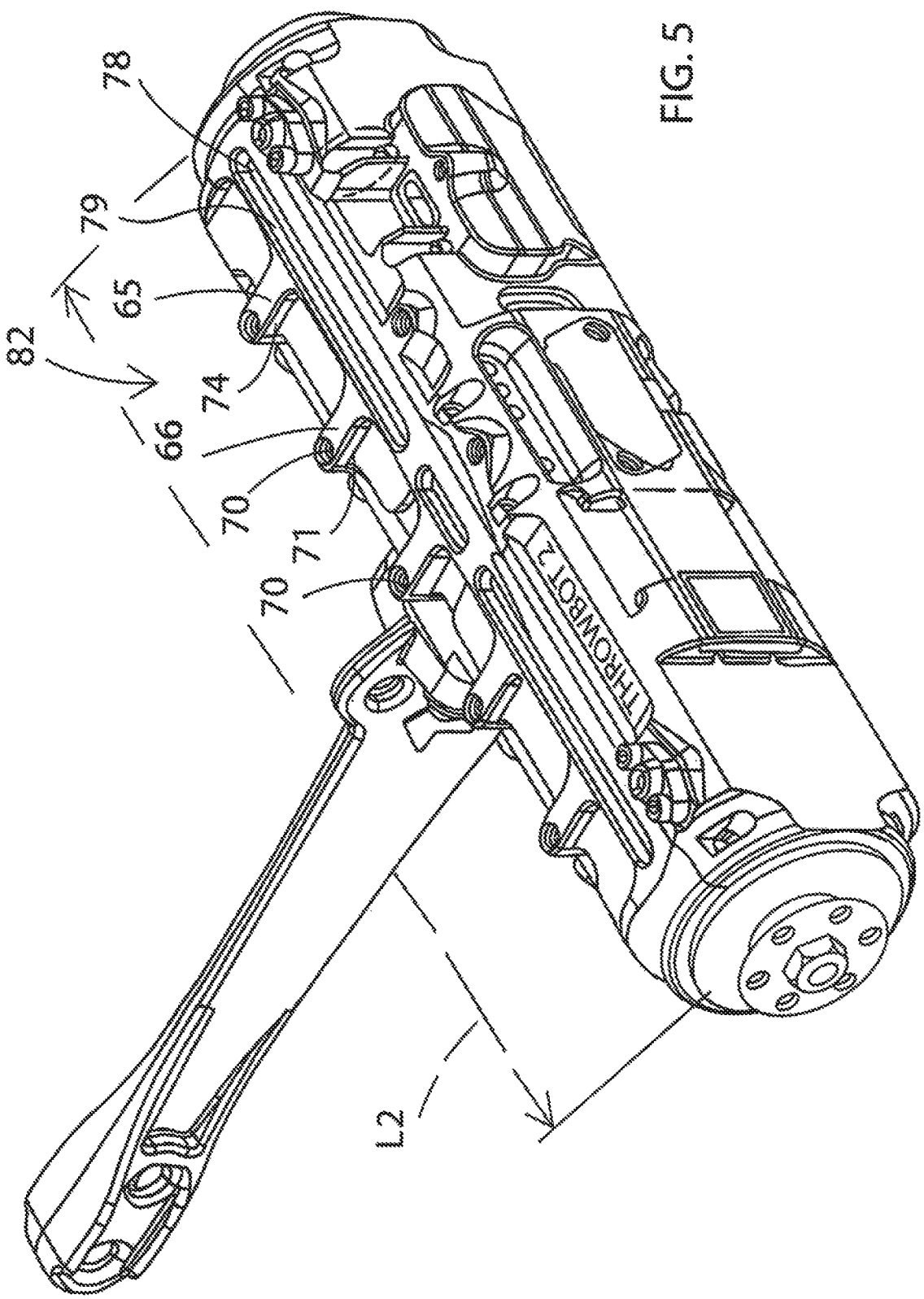
FIG. 5 is a perspective view of the body of FIG. 4.
Figure 6:
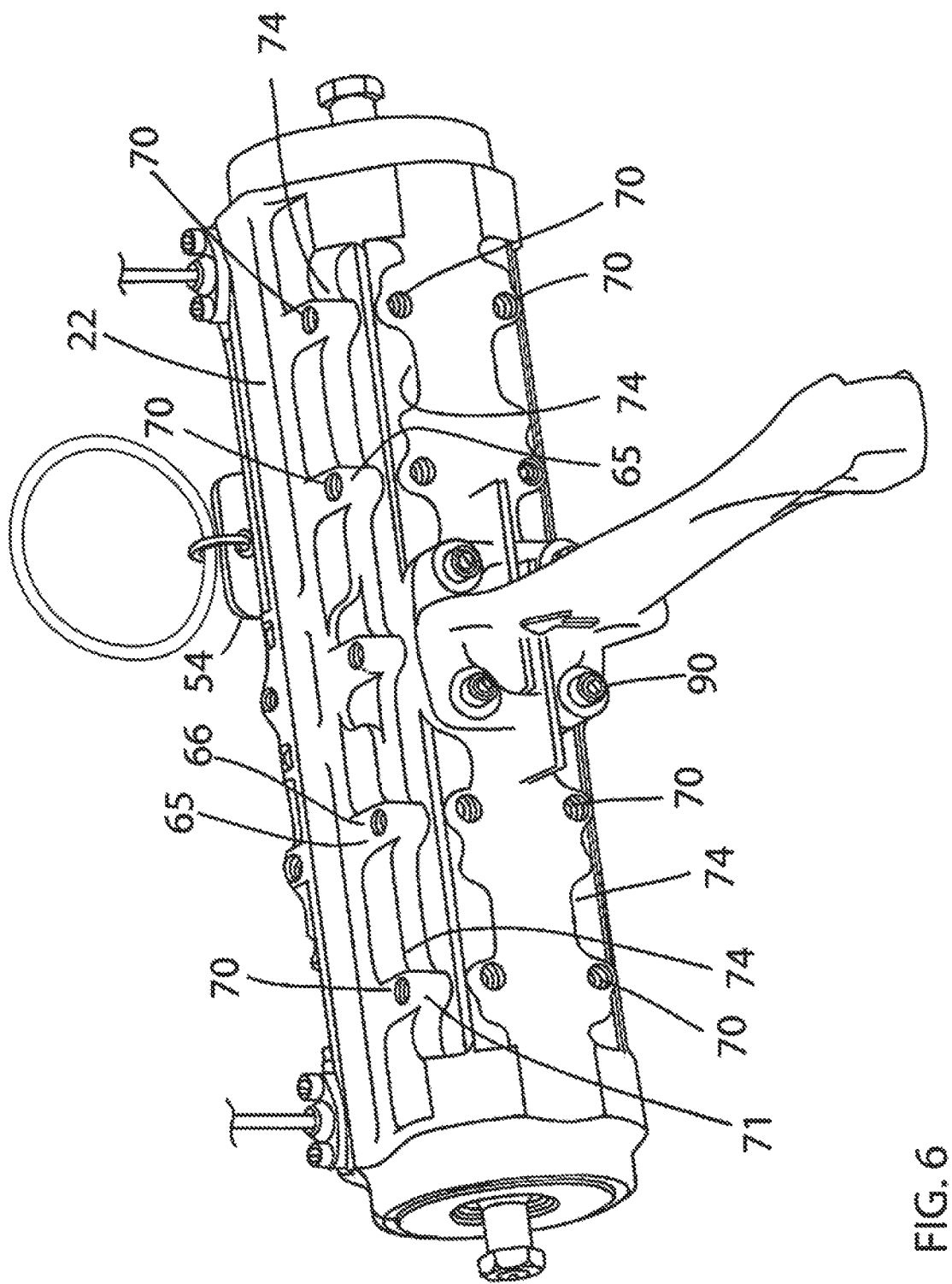
FIG. 6 is a rear reap perspective view of a body according to embodiments.

Referring to FIGS. 1-3 and 7, a throwable two wheeled robot 20 generally comprises an elongate body 22, a pair of motorized wheels 24, 26, and a tail 28 centrally positioned on the tail. The body having a forward side 30.1, a rearward side 30.2, a top side 30.3, and a bottom side 30.4. comprising a chassis 32, with a pair of clam shell portions 33, 34. A seal ring 35 may provide sealing. One portion, a rear portion, having a deep recess 38 and the other a shallow recess 40. The chassis defining an interior 40 that contains a pair of motors 44, batteries, 48 and a circuit board 50. The robot may be actuated by withdrawing a key 53 from a key slot 54.

Referring to FIGS. 1, 2, and 4-6, details of an exterior surface 58 of the chassis 32 are illustrated providing accessory mounting interfaces 62, 63, one on the top side of the body and one on the rear side of the body. The interface surfaces each comprising a projection 65 that has a landing 66 with a planar landing surface 68, one or more threaded holes 70 extending from the planar landing surface 68, and landing sidewall portions 71 with landing sidewall surfaces 74. The landings may also have recesses 78 with chassis wall surfaces 79 defining the recesses. The holes defining a matrixical arrangement 82 of the holes having a length L1 that more than half (most of) the length L2 of the elongate body portion and more than half (most of) the distance between the wheels L3.

Figure 7:
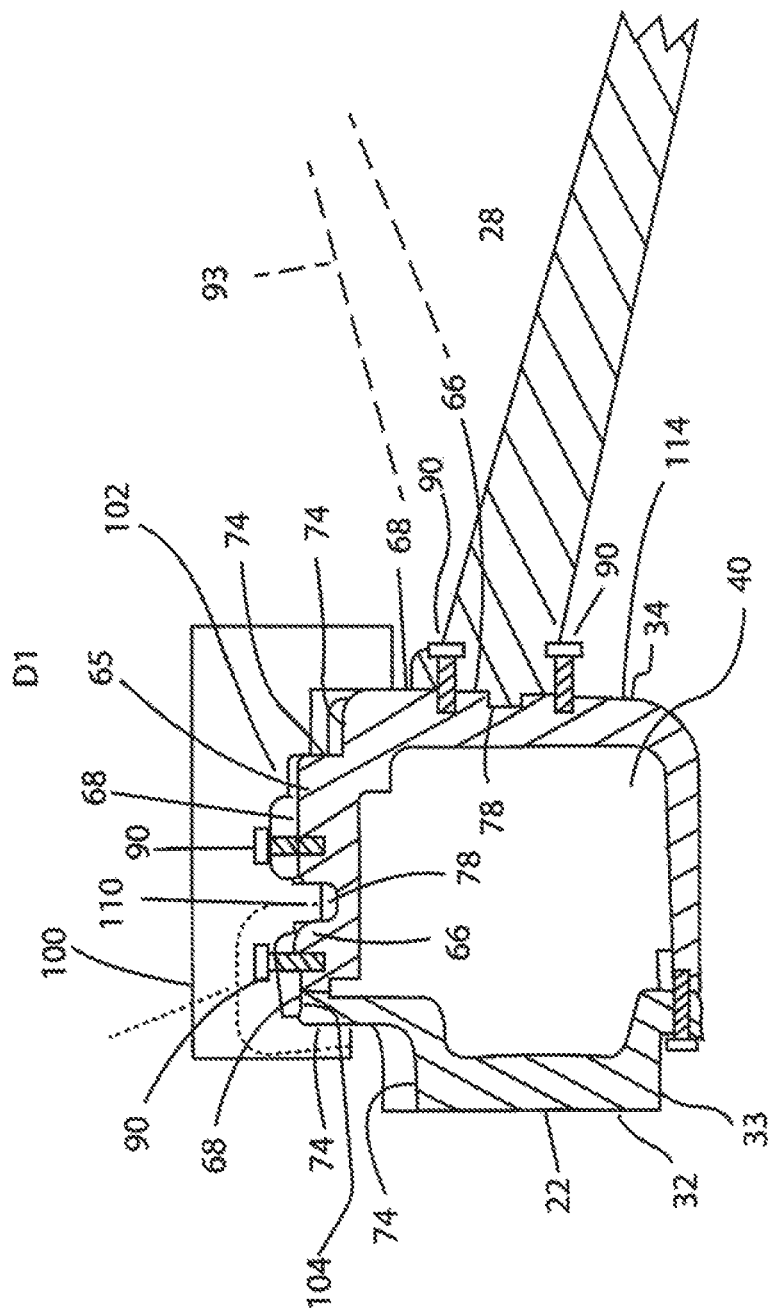
FIG. 7 is a cross sectional view of a robot showing the attachment of an accessory.

Referring to FIGS. 1 and 7-9, the tail may be attached to selected ones of one of the matrixical arrangements of the threaded holes at a landing 77 by way of threaded fasteners such as screws 90 and may be rotated 180 degrees to put the tail at a different position indicated by the dashed lines labeled 93. An accessory 100 may be attached to the chassis by a robot mounting interface 102 that includes surfaces 104 that abut the outwardly facing planar surfaces of the landing 66. Projections 110 may fit into one of the recesses 78. The accessory may wrap around and engage the rearward facing surface 114 of the rearward side of the chassis. The abutment of the accessory along surfaces that extend in the same direction as the axis 120 of the screws 90 allow the accessory to chassis interfaces to absorb shock that occurs upon impact after throwing the robot, rather than the screws. The arrangement of FIG. 7 provides, when the screws 90 are not connected, a one degree of freedom of movement, essentially moving the accessory in the direction D1.

The robot mounting interface of the accessory configured to cooperate with the accessory mounting interface of the robot chassis for providing the single degree of freedom of movement when the accessory is placed on the robot chassis for attachment thereto. The one degree of freedom may be provided by a C-shaped portion 123 as indicated by the dotted lines of FIG. 7. The portions of the C-shape portion corresponding to the upper and lower legs of a C may extend on opposite sides of a landing, or more generally a projection, providing protection from the screw shearing off or coming out of the threaded hole. Although FIG. 7 is in two dimensions, as can be seen from the perspective figures the mounting structure of the chassis is in three dimensions.

Referring to FIGS. 8 and 9, the wheels have an undeflected diameter or radius R1 and a deflected condition that occurs under shock, such as upon impact when the robot is thrown to take the wheel to a deflected diameter or radius R2. The radius R2 defining a cylindrical envelope E1. The envelope is reflective of the maximum deflection expected of the wheels under impact conditions. The space between the envelope E1 and the body or chassis 32 defining an accessory mounting region 130. The sizing of the accessory 100 to be within the accessory mounting region 130 protects the accessory from impact when throwing the robot with attached accessory. The accessory may be a sensor device, a munition, communication hardware, illumination device, gas dispensing device, or devices with other functionalities. The accessory may be powered by the robot or may have its own power source. The accessory may have its own communications module for communicating with a remote operator or may utilize communications provided by the robot.

Conventional throwable robots are illustrated in U.S. Pat. Nos. 7,559,385 and 9,061,544 and publication US 20120137862. Said patents and publication are incorporated by reference for all purposes. The embodiments herein are suitable for use with the components in these references.

Referring to the figures attached the holes for attachment of accessories are illustrated as well as a tail attached to such holes. The threaded holes may be only partially through the housing wall thereby maintaining watertight integrity of the housing. The tail has an angle from the housing such that rotation provides a different angle of viewing of the forward camera when positioned on a surface.

The following United States patents and publications are hereby incorporated by reference herein: U.S. Pat. Nos. 9,061,544, 6,548,982, 6,502,657, D637217, and D626577, US 2012/0137862 and U.S. Ser. No. 10/046,819. Components illustrated in such patents may be utilized with embodiments herein. Incorporation by reference is discussed, for example, in MPEP section 2163.07(B).

The invention is not restricted to the details of the foregoing embodiment (s). The invention extends to any novel one, or any novel combination, of the features disclosed in this specification (including any incorporated by reference references, any accompanying claims, abstract and drawings), or to any novel one, or any novel combination, of the steps of any method or process so disclosed The above references in all sections of this application are herein incorporated by references in their entirety for all purposes.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents, as well as the following illustrative aspects. The above described aspects embodiments of the invention are merely descriptive of its principles and are not to be considered limiting. Further modifications of the invention herein disclosed will occur to those skilled in the respective arts and all such modifications are deemed to be within the scope of the invention.

We claim:

1. A two wheeled throwable robot for receiving accessories, the robot comprising:
  an elongate body portion, the body portion having a top side, a bottom side, a forward side, a rearward side, and a pair of opposite ends;
  a pair of motorized wheels mounted on each of the opposite ends of the body portion, each of the wheels having a undeflected diameter, and being deflectable upon impact with a surface when the robot is thrown to a deflected diameter, wherein the deflected diameter defines a cylindrical envelope, and wherein the space between the body and the cylindrical envelope defines an annular accessory mounting space; and
  a rearwardly extending tail attached to the body portion at the rearward side intermediate the pair of opposite ends;
  wherein, the body portion comprising a chassis with at two chassis portions, the two chassis portions assembled together defining a sealed chassis interior, the body portion further comprising at least one motor, a circuit board with processing circuitry, and a battery mounted in the chassis interior, the body further comprising a forwardly directed camera;
  wherein the chassis has an exterior chassis surface that has a forward facing side, a top side, a bottom side, and a rearward side, at least one of the sides having a landing projecting from the side, the landing having an outwardly facing planar landing surface with a matrixical arrangement of a plurality of at least six threaded holes therein, each of the plurality of threaded holes not extending to the interior of the chassis, the matrixical arrangement extending at least most of a distance between the pair of motorized drive wheels, the landing having at least one of a) a plurality of landing sidewalls connecting to the planar landing surface, and b) a plurality of recesses within the landing surface.

2. The two wheeled throwable robot of claim 1 wherein the landing has both a plurality of landing sidewall surfaces extending to the planar landing surface, and a plurality of recesses within the landing surface.

3. The two wheeled throwable robot of claim 1 wherein at least two sides of the chassis has a landing projecting from the respective side, each landing having a planar landing surface.

4. The two wheeled throwable robot of claim 3 wherein the at least two sides includes the rearward side and the top side, each side having at least six threaded holes in a matrixical arrangement.

5. The two wheeled throwable robot of claim 1 in combination with an accessory, the accessory having a robot interface surface that includes an engagement surface that abuts one of the planar landing surfaces and further includes a surface that engages the chassis in the landing recesses or on the landing sidewall surfaces.

6. The combination of claim 5, wherein when the accessory is placed on the robot without threaded fasteners attaching the accessory to the robot, the accessory has one degree of freedom of separation of the accessory from the robot, the one degree of freedom allowing the accessory to be pulled outwardly away from the robot.

7. The combination of claim 5 wherein the accessory is one of a sensor, munition, communication device, illumination device, and gas dispensing device.

8. The combination of claim 5 wherein when the accessory is placed on the robot, the accessory is entirely within the annular accessory mounting space.

9. The combination of claim 5, wherein a plurality of threaded fasteners are utilized to attach the accessory to the robot on the top side and on the rearward side of the robot, each threaded fastener extending into one of the plurality of threaded holes of the robot.

10. The two wheeled throwable robot of claim 1, wherein each landing has a dovetail shape and comprises a rail for attachment of accessories.

11. A two wheeled throwable robot weighing less than five pounds for receiving accessories, the robot comprising:
  an elongate body portion having a length, the body portion having a top side, a bottom side, a forward side, a rearward side, and a pair of opposite ends;
  a pair of motorized wheels mounted on each of the opposite ends of the body portion; and
  a rearwardly extending tail attached to the body portion at the rearward side intermediate the pair of opposite ends;
  wherein, the body portion comprising a chassis with two clam shell chassis portions, one clam shell portion having a deep recess and the other clam shell portion having a shallow recess, each clam shell chassis portion extending the length of the body portion, the two clam shell chassis portions, when assembled, defining an open interior, the body portion further comprising at least one motor, a circuit board with processing circuitry, and a battery mounted in the chassis open interior, the body further comprising a forwardly directed camera;
  wherein the chassis has an exterior chassis surface that has a forward facing side, a top side, a bottom side, and a rearward side, the top side having a landing projecting outwardly, the landing having an outwardly facing planar landing surface and having a matrixical arrangement of a plurality of threaded holes extending inwardly and not extending to the interior of the chassis, the matrixical arrangement extending at least most of a distance between the pair of motorized drive wheels, the landing having at least one of a) a plurality of landing sidewalls connecting to the planar landing surface, and b) a plurality of recesses within the landing surface.

12. The two wheeled throwable robot of claim 11 wherein the top side of the chassis has a plurality of landings, each landing having an outwardly facing planar surface and at least one threaded hole associated therewith.

13. The two wheeled throwable robot of claim 12 wherein the rearward side of the chassis has a matrixical arrangement of threaded holes, none of the threaded holes extending into the interior of the chassis, the matrixical arrangement spanning a distance that is most of a length of the body.

14. The two wheeled throwable robot of claim 11 wherein each of the top side and rearward side of the chassis has at least six threaded holes arranged in the matrixical arrangement.

15. The two wheeled throwable robot of claim 11 further comprising an accessory attached to the robot chassis, the accessory having a robot mounting interface with a C-shaped portion wherein portions of the robot mounting interface corresponding to the lower leg and upper leg of the C engage one of recesses in landings or sidewalls of landings.

16. The two wheeled throwable robot of claim 11, wherein each wheel may deflect upon impact when thrown to a deflected diameter, and wherein the deflected diameter defines a cylindrical envelope, and wherein the space between the body and the cylindrical envelope defines an annular accessory mounting space.

17. The two wheeled throwable robot of claim 16 in combination with an accessory attached thereto, the accessory sized to be contained entirely within the annular accessory mounting space.

18. A two wheeled throwable robot weighing less than five pounds for receiving accessories, the robot comprising:
  an elongate body portion having a length, the body portion having a top side, a bottom side, a forward side, a rearward side, and a pair of opposite ends;
  a pair of motorized wheels mounted on each of the opposite ends of the body portion; and
  a rearwardly extending tail attached to the body portion at the rearward side intermediate the pair of opposite ends;
  wherein, the body portion comprising a chassis with an open interior, the body portion further comprising at least one motor, a circuit board with processing circuitry, and a battery mounted in the chassis open interior, the body further comprising a forwardly directed camera;
  wherein the chassis has an exterior chassis surface that has a forward facing side, a top side, a bottom side, and a rearward side, wherein at least two adjacent sides of the forward facing side, the top side, the bottom side, and the rearward side having an accessory interface, each accessory interface portion comprising a row of at least four threaded holes equally spaced and positioned between the pair of wheels, the row having a length, the length extending most of a distance between the pair of motorized wheels.

19. The two wheeled throwable robot of claim 18, wherein the top side and rearward side of the chassis have respective accessory interfaces.

20. The two wheeled throwable robot of claim 18, wherein each accessory interface portion has at least one planar surface and each of the at least four threaded holes of said interface extends inwardly from said at least one planar surface.

* * * * *